US000001816H

United States Statutory Invention Registration [19]

[11] Reg. Number: H1,816

Babrowicz

[45] **Published: *Nov. 2, 1999**

[54] ORIENTED, TUBULAR FILM AND HEAT-SHRINKABLE, PEELABLE BAG FOR VACUUM SKIN PACKAGING

[75] Inventor: Robert Babrowicz, Spartanburg, S.C.

[73] Assignee: Cryovac, Inc., Duncan, S.C.

[ * ] Notice: This patent is subject to a terminal disclaimer.

[21] Appl. No.: 09/109,129

[22] Filed: Jul. 1, 1998

[51] Int. Cl.[6] ..... A21D 10/02

[52] U.S. Cl. ..... 426/129; 426/106; 426/410; 426/415; 426/34.9

[56] References Cited

U.S. PATENT DOCUMENTS

| | | | |
|---|---|---|---|
| 3,329,549 | 7/1967 | Vilutis | 156/272 |
| 3,574,642 | 4/1971 | Weinke | 99/174 |
| 3,681,092 | 8/1972 | Titchenal et al. | 99/174 |
| 3,741,253 | 6/1973 | Brax et al. | 138/137 |
| 4,055,672 | 10/1977 | Hirsch et al. | 426/127 |
| 4,501,780 | 2/1985 | Walters et al. | 428/35 |
| 4,539,236 | 9/1985 | Vilutis | 428/35 |
| 4,580,393 | 4/1986 | Furukawa | 53/79 |
| 4,583,347 | 4/1986 | Nielsen | 53/434 |
| 4,724,185 | 2/1988 | Shah | 428/339 |
| 4,764,028 | 8/1988 | Wood et al. | 383/20 |
| 4,995,927 | 2/1991 | Garrett | 156/152 |
| 5,272,016 | 12/1993 | Ralph | 428/516 |
| 5,302,402 | 4/1994 | Dudenhoeffer et al. | 426/129 |
| 5,397,613 | 3/1995 | Georgelos | 428/36.7 |
| 5,419,795 | 5/1995 | Wood et al. | 156/184 |
| 5,562,959 | 10/1996 | Wood et al. | 428/34.9 |

*Primary Examiner*—Harold J. Tudor
*Attorney, Agent, or Firm*—Thomas C. Lagaly

[57] ABSTRACT

A heat-shrinkable bag generally includes a multilayer, coextruded, oriented, tubular film, the film comprising an inner, gas-permeable portion and an outer, substantially gas-impermeable portion peelably adhered to the inner portion at a peel force ranging from about 0.001 to about 2.5 pounds/inch.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORIENTED, TUBULAR FILM AND HEAT-SHRINKABLE, PEELABLE BAG FOR VACUUM SKIN PACKAGING

BACKGROUND OF THE INVENTION

The present invention relates to packaging for products, such as food products, that are initially enclosed under certain environmental conditions in a gas-impermeable, heat-shrunk bag. The bag includes an outer, gas-impermeable portion that peelably delaminates (i.e., delaminates upon peeling) to expose an inner, gas-permeable portion, thereby causing a change in the environmental conditions within the package. More specifically, the invention relates to such packaging for fresh red meat and poultry products.

Historically, large sub-primal cuts of meat have been butchered and packaged in each supermarket. This arrangement has long been recognized to be inefficient and expensive. It would instead be preferable to butcher and package the meat at a central processing facility which benefits from economies of scale, and then ship the packaged meat to individual supermarkets or other retail outlets such as is done, for example, with many poultry products. It is believed that central processing of meat would also lead to a higher quality, more sanitary product with a longer shelf-life than meat which is butchered and packaged in individual supermarkets.

Fresh red meat presents a particular challenge to the concept of centralized processing and packaging due to its oxygen-sensitivity. Such oxygen-sensitivity is manifested in the shelf-life and appearance (color) of a packaged meat product. For example, while a low-oxygen packaging environment generally increases the shelf-life of a packaged meat product (relative to meat products packaged in an environment having a higher oxygen content), red meat has a tendency to assume a purple color when packaged in the absence of oxygen or in an environment having a very low oxygen concentration, i.e., below about 5% oxygen. Unfortunately, such a purple color is undesirable to most consumers, and marketing efforts to teach the consumer about the acceptability of the purple color have been largely ineffective. When meat is exposed to a sufficiently high concentration of oxygen, e.g., as found in air, it "re-blooms" to a bright red color which most consumers associate with freshness. After 1 to 3 days of such exposure, however, meat assumes a brown color which, like the purple color, is undesirable to most consumers (and indicates that the meat is beginning to spoil).

Thus, in order to effectively butcher and package meat products in a central facility for distribution to retail outlets, the meat would desirably be packaged, shipped, and stored in a low-oxygen environment for extended shelf-life, and then displayed for consumer sale in a relatively high-oxygen environment such that the meat is caused to re-bloom to a red color just before being placed in a retail display case. While in the retail display case, the meat product is desirably contained in a package which protects it from microbial and other contamination. In order to attain the maximum economic benefit from centralized packaging, the package in which the meat product is displayed for consumer sale is the same package in which the meat product is initially packaged and shipped from the central processing facility. As can be appreciated, centralized butchering and packaging of fresh red meat presents a number of difficult packaging challenges.

A variety of packages have been developed in an effort to overcome the foregoing challenges. One class of such packages is known as "vacuum skin packaging," in which a product to be packaged has traditionally been placed on a supporting member, such as a rigid or semi-rigid tray, and essentially serves as a mold for a thermoformable film which is formed about the product and adhered to the tray by means of heat and differential air pressure. Virtually all of the air is evacuated from the interior of the package so that the film conforms very closely to the contour of the packaged product (see, e.g., U.S. Pat. Nos. Re. 30,009 (Purdue et al.) and 5,346,735 (Logan et al.), the disclosures of which are hereby incorporated herein by reference). When used to package fresh red meat products, it is necessary for both the film formed around the product and the support member to present a barrier to the passage of gases therethrough, particularly oxygen such as is found in air, which are detrimental to the shelf or storage life of fresh red meat. The thermoformed film generally includes both a gas-permeable film in contact with the product and a substantially gas-impermeable film which is peelably adhered to the gas-permeable film so that the gas-impermeable film may be peelably removed from the gas-permeable film, thereby allowing the meat product to re-bloom to the customer-preferred red color, e.g., at retail, while still being protected from dust, dirt, and other contaminates by the remaining gas-permeable film.

While traditional vacuum skin packaging as described above has proven to be advantageous for many packaging applications, difficulties in peeling the gas-impermeable film from the gas-permeable film can occur when the packaged meat product has a relatively high profile or is relatively bulky, such as, e.g., fresh beef roasts, in comparison with smaller cuts of meat such as steaks. For such high-profile meat cuts, a different type of "re-bloomable" package has been developed in which the meat product is first placed into a gas-permeable pouch and then the interior of the pouch is evacuated and the pouch is sealed closed. The sealed gas-permeable pouch with the meat product therein is next placed into an outer, gas-impermeable pouch, and a second vacuum and sealing step is performed to enclose the gas-permeable pouch within the gas-impermeable pouch. When it is desired to display the meat product for customer purchase at retail, the outer pouch is opened and the inner, gas-permeable pouch is placed in a display case after the meat product has re-bloomed (by virtue of oxygen contact with the meat via the gas-permeable inner pouch). While such a package avoids the peeling difficulties attendant with vacuum-skin packaging of high-profile meat cuts, other problems are encountered. It is desired for the inner pouch to be tightly contoured to the surface of the meat product. This is both for aesthetic reasons and to minimize purge, i.e., unsightly juices from the meat which otherwise collect between the meat surface and interior surface of the inner pouch. It has been found, however, that the second vacuum step causes the inner pouch to assume a looser fit about the meat product, thereby allowing purge to accumulate between the meat product and pouch. Not only is such a condition commercially unacceptable from an aesthetic standpoint, but the amount of time that the meat product stayed in bloom was found to decrease from the normal three-day period to approximately one day. Moreover, from a packaging standpoint, the two-step vacuum and sealing operation is an unacceptably long and cumbersome process.

Accordingly, there is a need in the art for a re-bloomable package for high-profile meat products which avoids the foregoing shortcomings of coventional packages.

SUMMARY OF THE INVENTION

That need is met by the present invention, which provides a heat-shrinkable bag comprising a multilayer, coextruded, oriented, tubular film, the film comprising an inner, gas-permeable portion and an outer, substantially gas-impermeable portion peelably adhered to the inner portion at a peel force ranging from about 0.001 to about 2.5 pounds/inch. The inner and outer portions of the film define an interface therebetween, and each of the inner and outer portions preferably include a layer disposed at the interface selected to peelably separate from one another when the bag is subjected to a peel force that falls within the foregoing range.

In accordance with another aspect of the invention, a package comprises a product enclosed in a heat-shrunk bag, the bag being formed from a multilayer, coextruded, oriented, tubular film as described above.

In accordance with another aspect of the invention, a method for making a package comprises the steps of:

a. providing a multilayer, coextruded, oriented, tubular film as described above and having two open ends;

b. sealing closed one of the two open ends of the tubular film to thereby form a bag;

c. placing a product, such as fresh red meat or poultry, into the bag; and d. sealing closed the other open end of the tubular film to thereby enclose the product within the bag. Preferably, the bag is subsequently heated sufficiently to cause it to shrink about the contour of the product.

Where the product is a fresh red meat or poultry product, the inner portion of the package is preferably evacuated of air to enhance the shelf-life of the product. An advantageous feature of the invention is that, since the tubing from which the bag is formed comprises an outer, gas-impermeable portion that is integral with the inner, gas-permeable portion, only one evacuation step is needed to remove air from within the package. This avoids the above-described difficulties of using a two-pouch packaging system that requires two separate evacuation procedures. At the same time, since the outer, gas-impermeable portion of the package is peelably removable from the inner, gas-permeable portion, a fresh red meat or poultry product can be displayed for consumer purchase while in a state of re-bloom by simply removing the gas-impermeable portion. In this manner, the meat product can be shipped, stored, and displayed in the same package without the need for repackaging.

DEFINITIONS

As used herein, the term "film" refers to a thermoplastic material, generally in sheet or web form, having one or more layers of polymeric or other materials which may be bonded together by any suitable means well known in the art, e.g., coextrusion, lamination, etc. A film can be a monolayer film (having only one layer), or a multilayer film (having two or more layers), and is preferably substantially transparent.

As used herein, the term "layer" refers to a discrete film component which is coextensive with the film and has a substantially uniform composition. In a monolayer film, the "film" and "layer" would be one and the same.

As used herein, the terms "extrusion," "extrude," and the like refer to the process of forming continuous shapes by forcing a molten plastic material through a die, followed by cooling or chemical hardening. Immediately prior to extrusion through the die, the relatively high-viscosity plastic (polymeric) material is fed into a rotating screw, which forces it through the die. The related terms "coextrusion," "coextrude," and the like refer herein to the process of extruding two or more materials through one or more dies with two or more orifices arranged so that at least a portion of the extrudates merge and weld together into a laminar structure before chilling, i.e., quenching. The term "coextrusion" also includes "extrusion coating," wherein one or more molten layers are extruded or coextruded through one or more dies onto a monolayer or multilayer film substrate such that the molten layers melt-bond with the substrate, i.e., without the use of an adhesive, to form a film having two or more layers.

As used herein, the term "tubular" refers to a film that is extruded through a die having an annular opening to form a plastic tube that is preferably inflated by internal pressure exerted by air trapped within a portion of the tube by pinch rolls, the rolls then causing the tubing to collapse after it has cooled sufficiently to allow it to subsequently be re-opened, i.e., without the inner portion of the tube melt-bonding together.

As used herein, the terms "heat-shrinkable," "heat-shrink" and the like refer to the tendency of a film, generally an oriented film, to shrink upon the application of heat, i.e., to contract such that the size (area) of such film in an unrestrained state decreases or the tension of such film in a restrained state increases. As a corollary, the term "heat-shrunk" refers to a heat-shrinkable film, or a portion thereof, which has been exposed to heat such that the film or film portion is in a contracted state, i.e., reduced in size (unrestrained), or under increased tension (restrained).

As used herein, the term "oriented" or "stretch-oriented" refers to a film which has been stretched at an elevated temperature (the orientation temperature), followed by being "set" in the stretched configuration by cooling the material while substantially retaining the stretched dimensions. A film can be stretched in one direction (uniaxial orientation), two directions (biaxial orientation), or multiple directions. Biaxial orientation typically occurs in two directions which are perpendicular to one another, such as the machine direction (i.e., along the longitudinal dimension of the film) and the transverse direction (i.e., transverse to the machine direction). Upon reheating, an oriented film will shrink in the direction of orientation.

As used herein, the phrase "orientation ratio" refers to the multiplication product of the extent to which a film is expanded in any one direction during the orientation process. Thus, an orientation ratio of, e.g., 2:1 in the machine direction, indicates that the film has been expanded to twice its original dimension in the machine direction of the film. When a film is biaxially oriented, the orientation ratios are conventionally expressed as "[machine direction (MD) ratio]×[transverse direction (TD) ratio]" or "[TD ratio]×[MD ratio]," however designated. Thus, a biaxial orientation ratio of 2:1 in the MD and 3:1 in the TD would be expressed as a "MD×TD orientation ratio of 2:1×3:1" or, more simply, "2×3."

As used herein, the phrase "gas-permeable" refers to a film or web which admits at least about 1,000 cc of gas, such as oxygen, per square meter of film per 24 hour period at 1 atmosphere and at a temperature of 73° F. (at 0% relative humidity). More preferably, a gas-permeable film or web admits at least 5,000, even more preferably at least 8,000 such as at least 10,000, 15,000, or 20,000 cc of oxygen per square meter per 24 hour period at 1 atmosphere and at a temperature of 73° F. (at 0% relative humidity). In accordance with the present invention, a gas-permeable film or web can itself have the aforedescribed levels of gas permeability or, alternatively, can be a film or web which does not inherently possess such levels of gas permeability but which is altered, e.g., perforated, to render the film or web gas-permeable as defined above.

As used herein, the phrase "substantially gas-impermeable" refers to a film or web which admits less than 1000 cc of gas, such as oxygen, per square meter of film per 24 hour period at 1 atmosphere and at a temperature of 73° F. (at 0% relative humidity). More preferably, a substantially gas-impermeable film or web admits less than about 500, such as less than 300, and less than 100 cc of gas, more preferably still less than about 50 cc, and most preferably less than 25 cc, such as less than 20, less than 15, less than 10, less than 5, and less than 1 cc of gas per square meter per 24 hour period at 1 atmosphere and at a temperature of 73° F. (at 0% relative humidity).

As used herein, the term "peel-force" refers to the amount of force required to peelably delaminate a multilayer film in accordance with ASTM F904-91, and is reported in units of force/width of the multilayer film.

As used herein, the term "heat-seal" (also known as a "heat-weld") refers to the union of two films by bringing the films into contact, or at least close proximity, with one another and then applying sufficient heat and pressure to a predetermined area (or areas) of the films to cause the contacting surfaces of the films in the predetermined area to become molten and intermix with one another, thereby forming an essentially inseparable bond between the two films in the predetermined area when the heat and pressure are removed therefrom and the area is allowed to cool. In accordance with the practice of the present invention, a heat-seal preferably creates a hermetic seal, i.e., a barrier to the outside atmosphere.

DETAILED DESCRIPTION OF THE INVENTION

In accordance with the present invention, a heat-shrinkable bag for vacuum skin packaging is formed from a multilayer, coextruded, oriented, tubular film. The film can be made by any conventional tubular coextrusion process, e.g., by extrusion-coating, provided that the film is constructed with an inner, gas-permeable portion and an outer, substantially gas-impermeable portion peelably adhered to the inner portion at a peel force ranging from about 0.001 to about 2.5 pounds/inch. That is, the "inner" portion of the tubular film is that portion which includes the inside surface of the tube while the "outer" portion of the tubular film is that portion which includes the outside surface of the tube. When the tube is formed into a bag for packaging a product, the inner portion of the tube is adjacent to and in contact with the product. The outer, gas-impermeable portion of the tube substantially prevents oxygen from coming in contact with the packaged product during shipping and storage, and thereby allows the product to be packaged in a low-oxygen environment that serves to prolong the self-life of the product when such product is oxygen-sensitive, i.e., one that degrades over a period of time in the presence of oxygen such as, e.b., fresh red meat or poultry. In such a low-oxygen environment, a meat product will assume an undesirable purple color. However, when it is desired to display the product for customer purchase, the outer, gas-impermeable portion of the bag is peelably removed so that atmospheric oxygen can enter the bag via the remaining gas-permeable portion, thereby causing the product to re-bloom to a customer-preferred red color.

The inner, gas-permeable portion of the tubular film can be monolayer or multilayer, i.e., it can comprise one or more layers as desired. The primary requirement of the inner portion is that it is "gas-permeable" as defined above so that a packaged fresh meat or poultry product will bloom when the outer, gas-impermeable portion is peelably removed from the package. Preferably, the inner portion of the tubular film has an oxygen transmission rate of at least 16,000 cc-mil/$m^2$-atm.-24 hrs. Thus, when the inner portion has a thickness of 1 mil, the oxygen transmission thereof is preferably at least 16,000 cc/$m^2$-atm.-24 hrs.; an inner film portion having a thickness of 2 mils preferably has an oxygen transmission rate of at least 8,000 cc/$m^2$-atm.-24 hrs.; etc. It is preferred that the inner portion of the tubular film has a thickness of 5 mils or less, preferably 4 mils or less, more preferably 3 mils or less, and most preferably 2 mils or less.

The inner portion is also heat-shrinkable so that it tightly heat-shrinks about the contour of the packaged product to give a tight, aesthetically-appealing package appearance as well as minimizing the collection of purge or other juices between the product and the inside surface of the bag.

The outer, gas-impermeable portion of the tubular film may be monolayer or multilayer and may include any suitable layer or layers that provide a substantial barrier to the passage of oxygen gas therethrough. In this regard, any well known oxygen-barrier material may be included in the outer film portion, such as, e.g., vinylidene chloride copolymer (saran), nylon, polyethylene terephthalate, ethylene/vinyl alcohol copolymer (EVOH), silicon oxides (SiOx), etc. The outer portion is also preferably heat-shrinkable.

In accordance with the present invention, the inner and outer portions of the tubular film are capable of peelably delaminating from one another when subjected to a peel force ranging from about 0.001 to about 2.5 pounds/inch. That is, the inner and outer portions are peelably adhered to one another (as a result of the coextrusion process) at a bond-strength ranging from about 0.001 to about 2.5 pounds/inch. A bond-strength (requiring a peel force) falling within this range provides a balance between sufficient adhesion to prevent premature separation of the outer portion from the inner portion, e.g., during manufacture, shipping and storage, and sufficient peelability so that gas-impermeable outer portion can be separated from gas-permeable inner portion at retail without tearing or otherwise compromising the remaining gas-permeable portion. A film requiring a peel-force of more than about 2.5 pounds/inch for delamination results in a package that is overly difficult to peel, while a bond strength of less than about 0.001 pounds/inch creates a greater likelihood of premature separation of the gas-impermeable portion from inner, gas-permeable portion. More preferably, the inner and outer portions of the film are peelably adhered at a bond-strength requiring a peel force ranging from about 0.01 to about 0.1 pounds/inch for peelable delamination.

A representative structure for a tubular film in accordance with the present invention is (inside of tube) A/B//C/D (outside of tube), where layers A and B comprise the inner, gas-permeable portion of the tubular film and layers C and D comprise the outer, gas-impermeable portion. The materials from which layers A and B are constructed, as well as the thickness of those layers, should be such that, in combination, the inner film portion is "gas-permeable" as described above. In addition, layer A preferably comprises a material that can form a heat-seal with itself so that the tubing can be severed in discrete lengths and the ends of the tubing heat-sealed closed to form an enclosed bag for a product. Suitable, heat-sealable materials are well known in the art and include, for example, polyethylene homopolymers and copolymers such as, e.g., ionomers, EVA, EMA, or heterogeneous (Zeigler-Natta catalyzed) and homogeneous (metallocene, single-cite catalyzed) ethylene/alpha-olefin copolymers. Various other materials are also suitable such as, e.g., propylene/ethylene copolymer.

Layers C and D should, in combination, render the entire film structure substantially gas-impermeable as discussed above. In this regard, layer D and/or layer C preferably comprise an oxygen-barrier material, such as one or more of the oxygen-barrier materials listed above. In addition, layer D preferably provides abuse-resistance to the film. Suitable materials for layer D include, e.g., EVA, heterogeneous or homogeneous ethylene/alpha-olefin copolymers, HDPE, polypropylene, or propylene/ethylene copolymer.

The inner and outer portions of the film define an interface therebetween, as represented by the double slashes ("//"), at which the film peelably delaminates. Preferably, each of the inner and outer portions includes a layer i.e., respective layers B and C, that are disposed at the interface and which are bonded to and peelably separable from one another when the tube (or bag made from the tube) is subjected to a peel force of sufficient magnitude to overcome the bond-strength between layers B and C. In this regard, one of the layers at the interface may comprise a polar material while the other layer comprises a non-polar material. Thus, one of the interface layers, preferably layer B of the inner, gas-permeable portion, may comprise non-polar polyethylene homopolymer or copolymer, polypropylene homopolymer or copolymer, or polymethylpentene. The other adjacent film layer, preferably layer C of the outer, gas-impermeable portion, may comprise polyamide, copolyamide, polyester, copolyester, polar polyethylene copolymers (e.g., EVOH), polycarbonate, polyvinylidene chloride copolymer (saran), polyurethane, polybutylene homopolymer and copolymer, or polysulfone.

Alternatively, one of the layers B or C at the peel interface may comprise polyethylene homopolymer or copolymer while the other layer comprises polypropylene homopolymer or copolymer, regardless of the polarity of the materials. Similarly, one of the peel interface layers, preferably layer B, may comprise styrene/butadiene copolymer while the other layer, i.e., layer C, comprises EVOH.

It should also be noted that the inter-layer adhesion between adjacent layers B and C may be increased or decreased as desired by the inclusion of additives into one or both layers which serve to promote or defeat adhesion between such layers. Examples of adhesion-promoting additives include, e.g., anhydride-modified or acid-modified polyolefins. Examples of adhesion-defeating additives include, e.g., teflon, anti-block agents (e.g., silica, clay, or glass beads), anti-fog agents, etc.

The foregoing combinations of materials for the layers at the interface between the inner and outer portions of the tubular film are advantageously capable of being coextruded and forming a peelable bond. Thus, no additional steps, such as laminating the outer, gas-impermeable portion to the inner, gas-permeable portion via, e.g., a repositionable adhesive, need be taken to ensure peelability at the desired interface.

The tubular film in accordance with the present invention can be made by any known coextrusion process by melting the component polymers and coextruding them through one or more annular dies, optionally irradiating one or more of the component layers of the multilayer film to promote cross-linking therein, and then orienting, preferably biaxially orienting, the tube, thereby producing a heat-shrinkable tubular film. When saran is employed in the outer, gas-impermeable portion of the film and it is desired to cross-link the molecules in the layers comprising the inner, gas-permeable portion, it is preferred that the film be made via extrusion-coating as described, e.g. in U.S. Pat. Nos. 3,741,253 and 4,501,780, the disclosures of which are hereby incorporated herein by reference. In accordance with the teachings of those patents, layers A and B are fed from two extruders into a single annular coextrusion die to form a continuous tube with A as the inside layer and B as the outside layer. The A/B tube can then be cooled, e.g., by exposure to air or water, flattened, and then optionally exposed to ionizing radiation to promote cross-linking in layers A and B. This may be accomplished by guiding the flattened tube through the beam of an electron accelerator one or more times so that the tube receives a radiation dosage, e.g., in the range of from about 30 to about 100 Kilograys. Irradiation by electrons to cross-link the molecules of polymeric material is well known in the art. As is also well known, it is undesirable to expose saran to such ionizing radiation because of its tendency to degrade and discolor upon such exposure. Thus, where layers C and/or D contain saran, such layers are added to the tubing via extrusion-coating following irradiation. If, for example, only layer D contains saran, layers A, B, and C can be coextruded and irradiated, and then layer D can be extrusion-coated onto the irradiated and cross-linked A/B/C substrate if desired. However, where layer C contains saran, then layers C and D are preferably extrusion-coated onto the irradiated A/B substrate. This is effected by inflating the tubular A/B substrate downstream of the electron accelerator, and then passing the inflated tubing through an extrusion coating die wherein saran-containing layer C is extruded onto layer B of the tubular A/B substrate. Next, the A/B/C tubing is fed through another extrusion-coating die wherein layer D is extruded onto layer C.

After the final layer, i.e., layer D, has been applied, the tubular film is cooled, collapsed, and then fed into a hot water tank maintained at a temperature ranging, e.g., from about 185 to about 212° F. to soften the film for orientation. At this point, the pre-oriented tube has a thickness ranging, e.g., from about 8 to about 22 mils. Out of the hot water bath, the tube passes through pinch rolls and is inflated into a bubble by an air pocket that is trapped between two sets of pinch rolls. As a result of being stretched into a bubble, the film is oriented. The film is then allowed to cool rapidly, normally via air cooling, so that the orientation is "locked in" to render the film heat-shrinkable at or above the temperature at which it was stretched.

Preferably the tubular film is biaxially oriented, i.e., longitudinally (machine direction or "MD"), by pulling the film from the hot water tank at a rate that is faster than the rate at which the film enters the bath, and transversely (transverse direction or "TD") due to the increased width of the trapped bubble in comparison to the initial width of the tubing. In this regard, the film is preferably oriented in at least one direction at an orientation ratio of at least about 1.5:1, more preferably at least about 2:1, even more preferably at least about 2.5:1, and most preferably at least about 3:1. The film is more preferably biaxially oriented at an orientation ration (TD×MD) of at least about 1.5:1×1.5:1, yet more preferably 2:1×2:1, more preferably still 2.5:1×2.5:1, and most preferably at least about 3:1×3:1. The film preferably has a free shrink, at a temperature of about 185° F., of at least about 10 percent in at least one direction, more preferably at least about 20 percent, more preferably still at least about 30 percent, yet more preferably at least about 40 percent, and most preferably between 40 to 50 percent in at least one direction, and preferably in both the transverse and machine directions.

The final step in the process is to collapse the oriented tube and then wind it on a storage roll as a flattened tube for subsequent use in making bags for the packaging of fresh meat or other products. The final, oriented tubular film has a thickness ranging from about 1 to about 4 mils.

By a process that is well known in the art, bags are made from the tubular film by severing predetermined lengths from the tube and applying heat and pressure to one of the open ends to seal it closed via heat-welding. This is known as an "end seal" bag. Alternatively, both open ends of the tube can be heat-sealed and a slit can be made along the length of the tube to form an opening. This is known as a "side seal" bag. In either case, heat-shrinkable bags with one opening are formed.

The bags are supplied to a meat, poultry, or other food packager to be closed and sealed after insertion of, e.g., a fresh meat or fresh poultry product therein. After the product is inserted, air is normally at least partially evacuated from the bag, the open end of the bag is closed, such as by heat sealing or applying a metal clip, and finally heat is applied to effect film shrinkage about the product. The final heating step is generally carried out by immersing the bag, typically for a few seconds in a hot water bath at approximately the same temperature at which the film was stretch-oriented, typically about 160° to 205° F. (71.1° C. to 96.1° C.). Hot water immersion is preferred as being a quick and economical means of transferring sufficient heat to the bag to cause it to shrink uniformly about the product. Heat-shrinking of the bag about the product is highly desirable in that it removes or minimizes wrinkles, helps to eliminate purge, and generally makes a more attractive package.

Packaging apparatus for carrying out the foregoing packaging process are well known in the art and are described, e.g., in U.S. Pat. Nos. 4,580,393 and 4,583,347, the disclosures of which are hereby incorporated herein by reference.

Although any product can be packaged within the aforedescribed heat-shrinkable bag in accordance with the present invention, such bag is most advantageously utilized for products which are desirably packaged for shipment and storage in one environment, e.g., a low-oxygen environment, and then displayed in the presence of atmospheric oxygen. Such products include, but are not limited to, fresh red meat products (e.g., beef, veal, lamb, pork, etc.), poultry, fish, cheese, fruits, or vegetables.

The final step in the packaging process, i.e., just prior to placing the bag in a retail display case, is to peelably remove the outer, gas-impermeable portion from the bag. Peel can be initiated by constructing the tubular film from which the bag is formed such that the inner, gas-permeable portion shrinks to a different degree than the outer, gas-impermeable portion. In this manner, the inner and outer portions have been found to separate outside of the heat-seals, thereby providing the retail worker with place to grasp the outer, gas-impermeable portion so that such portion can be peeled from the remainder of the package. In this regard, the gas-impermeable portion can be peeled from one or both sides of the bag as desired.

As a result of the peeling process, a packaged fresh meat or poultry product re-blooms to a consumer-preferred red color by virtue of atmospheric oxygen contacting the product through the now-exposed inner, gas-permeable portion of the bag. At the same time, this remaining gas-permeable enclosure continues to protect the product from dust, dirt, moisture, and microbial as well as other contaminates.

If desired, a pad of an absorbent material may be included within the bag to absorb any purge that may be present therein. Such absorbent pads are well known in the art.

The invention may be further understood by reference to the following examples, which are provided for the purpose of representation, and are not to be construed as limiting the scope of the invention.

EXAMPLE

A tubular film in accordance with the present invention had the following structure:

(inside of tube) A/B/C//D/E/F/G (outside of tube), wherein:

"A"=80 wt. % homogeneous (single-site catalyzed) ethylene/octene-1 copolymer sold by Dow Chemical as AFFINITY PL1280 and having 13 wt. % octene-1, a density of 0.90 g/cc, and a melt index of 6.0, and 20 wt. % heterogeneous ethylene/hexene copolymer sold by Exxon as ESCORENE LL3003.32 and having 10 wt. % hexene, a density of 0.92 g/cc, and a melt index of 3.2;

"B"=60 wt. % homogeneous (single-site catalyzed) ethylene/octene-1 copolymer sold by Dow Chemical as AFFINITY DPF 1190 and having a density of 0.90 g/cc and a melt index of 0.9, 30 wt. % heterogeneous linear low density polyethylene (ethylene/octene copolymer) sold by Dow Chemical as DOWLEX 2045.03 and having 6.5 wt. % octene-1 copolymer, a density of 0.92 g/cc, and a melt index of 1.1, and 10 wt. % ethylene/propylene/diene terpolymer sold by Bayer as BUNA EP-T-2370-P and having a melt index of 2, 72 wt. % ethylene, and 3 wt. % ENB;

"C"=propylene/ethylene copolymer having a melt flow index of 3.2–4.4, a density of 0.9 g/cc, and 3.3 wt. % ethylene; obtained from Exxon under the tradename ESCORENE™ PD 9302;

"D"=vinylidene chloride/methyl acrylate copolymer having 91.5 wt. % vinylidene chloride and 8.5 wt. % methyl acrylate; sold by Dow as SARAN MA-134;

"E"=ethylene/methyl acrylate copolymer sold by Chevron as EMAC SP 1305 and having 20 wt. % methyl acrylate, a density of 0.94 g/cc, and a melt index of 2;

"F"=homogeneous (single-site catalyzed) ethylene/octene-1 copolymer sold by Dow Chemical as AFFINITY DPF 1150.01 and having 12.5 wt. % octene-1, a density of 0.9 g/cc, and a melt index of 0.9; and "G"=85 wt. % homogeneous (single-site catalyzed) ethylene/octene-1 copolymer sold by Dow Chemical as AFFINITY PL 1850 and having 12 wt. % octene-1, a density of 0.9 g/cc, and a melt index of 3, and 15 wt. % heterogeneous linear low density polyethylene (ethylene/octene copolymer) sold by Dow Chemical as DOWLEX 2045.03 and having 6.5 wt. % octene-1 copolymer, a density of 0.92 g/cc, and a melt index of 1.1.

The A/B/C layers were first coextruded as a three-layer tubular film structure and then irradiated by electron beam radiation at a dosage of 70 Kilogray. Layers D/E/F/G were then sequentially extrusion coated onto the A/B/C substrate and melt-bonded thereto at the interface designated by the double slashes ("//"). The relative thickness of each of the component layers, in mils, was

A / B /C// D /E /F/G
4.5/10.5/1//2.2/1.5/3/1.5

The film was then biaxially oriented by heating the film to 2 10° F. and passing it over an inflated bubble of air to provide transverse stretching while also stretching in the longitudinal or machine direction. The biaxially oriented tubular film was quenched immediately after stretching and had an average wall thickness of 2 mils. The film had an orientation ratio of 4:1 in the transverse direction and 3:1 in the machine direction.

Bags were made from the tubular film by severing predetermined lengths from the tubing and sealing closed one end of each of the severed lengths. Fresh chuck roasts weighing 2–3 pounds each were then placed in each of the bags, the interior of each bag was evacuated of air, and the bags were heat-sealed closed and heated in hot water to cause the bags to shrink tightly about the roasts. The resultant packages were stored at a temperature ranging from 32°–38° F. for up to 25 days. Thereafter, the outer, gas-impermeable portion of the packages (i.e., layers D/E/F/G) were peelably delaminated at the intended // interface shown above. The roasts re-bloomed to a red color (from a purple color exhibited during storage), indicating both that the pre-peeled bags provided a sufficient oxygen barrier to preserve the fresh meat during storage and also that the remaining A/B/C inner, gas-permeable portion provided sufficient oxygen permeability to allow the meat to bloom for retail display. In addition, only a slight amount of purge was observed between the meat products and the inner surfaces of the bags.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A heat-shrinkable bag comprising a multilayer, coextruded, oriented, tubular film, said film comprising an inner, gas-permeable portion and an outer, substantially gas-impermeable portion peelably adhered to said inner portion at a peel force ranging from about 0.001 to about 2.5 pounds/inch.

2. The bag of claim 1, wherein said inner and outer portions of said film define an interface therebetween, each of said inner and outer portions including a layer disposed at said interface, said layers being bonded to and peelably separable from one another when said bag is subjected to said peel force.

3. The bag of claim 2, wherein one of the layers at said interface comprises a polar material and the other layer comprises a non-polar material.

4. The bag of claim 2, wherein one of the layers at said interface comprises polyethylene homopolymer or copolymer and the other layer comprises polypropylene homopolymer or copolymer.

5. The bag of claim 1, wherein said inner and outer portions of said film are peelably adhered at a peel force ranging from about 0.01 to about 0.1 pounds/inch.

6. A package, comprising a product enclosed in a heat-shrunk bag, said bag formed from a multilayer, coextruded, oriented, tubular film, said film comprising an inner, gas-permeable portion and an outer, substantially gas-impermeable portion peelably adhered to said inner portion at a peel force ranging from about 0.001 to about 2.5 pounds/inch.

7. The package of claim 6, wherein said product is selected from the group consisting of fresh meat and fresh poultry.

8. The package of claim 6, wherein said inner and outer portions of said film define an interface therebetween, each of said inner and outer portions including a layer disposed at said interface, said layers being bonded to and peelably separable from one another when said bag is subjected to said peel force.

9. The package of claim 8, wherein one of the layers at said interface comprises a polar material and the other layer comprises a non-polar material.

10. The package of claim 8, wherein one of the layers at said interface comprises polyethylene homopolymer or copolymer and the other layer comprises polypropylene homopolymer or copolymer.

11. The package of claim 6, wherein said inner and outer portions of said film are peelably adhered at a peel force ranging from about 0.01 to about 0.1 pounds/inch.

12. A method for making a package, comprising:

a. providing a multilayer, coextruded, oriented, tubular film having two open ends, said film comprising an inner, gas-permeable portion and an outer, substantially gas-impermeable portion peelably adhered to said inner portion at a peel force ranging from about 0.001 to about 2.5 pounds/inch;

b. sealing closed one of the two open ends of said tubular film to thereby form a bag;

c. placing a product into said bag; and d. sealing closed the other open end of said tubular film to thereby enclose the product within said bag.

13. The method of claim 12, wherein said product is selected from the group consisting of fresh meat and fresh poultry.

14. The method of claim 12, further including, prior to enclosing the product with said bag, the step of at least partially evacuating air from said bag.

15. The method of claim 12, further including the step of heating said bag to thereby cause said bag to heat-shrink about said product.

16. The method of claim 12, further including the step of peelably removing said outer, gas-impermeable portion from said bag.

17. The method of claim 12, wherein said inner and outer portions of said film define an interface therebetween, each of said inner and outer portions including a layer disposed at said interface, said layers being bonded to and peelably separable from one another when said bag is subjected to said peel force.

18. The method of claim 17, wherein one of the layers at said interface comprises a polar material and the other layer comprises a non-polar material.

19. The method of claim 18, wherein one of the layers at said interface comprises polyethylene homopolymer or copolymer and the other layer comprises polypropylene homopolymer or copolymer.

20. The method of claim 12, wherein said inner and outer portions of said film are peelably adhered at a peel force ranging from about 0.01 to about 0.1 pounds/inch.

* * * * *